United States Patent [19]

Rogers et al.

[11] Patent Number: 5,290,522
[45] Date of Patent: Mar. 1, 1994

[54] CATALYTIC CONVERTER MOUNTING MAT

[75] Inventors: John J. Rogers, St. Paul; John L. Erickson, White Bear Lake; Stephen M. Sanocki, Stillwater, all of Minn.

[73] Assignee: Minnesota Mining and Manufacturing Company, St. Paul, Minn.

[21] Appl. No.: 1,178

[22] Filed: Jan. 7, 1993

[51] Int. Cl.$^5$ .............................................. B01D 53/36
[52] U.S. Cl. .................................... 422/179; 422/180; 422/221; 422/222; 60/299; 60/301; 501/95; 501/127
[58] Field of Search ............... 422/179, 180, 221, 222; 502/251; 60/299, 301; 501/95, 127

[56] References Cited

U.S. PATENT DOCUMENTS

| Re. 27,747 | 9/1973 | Johnson | 976/DIG. 39 |
|---|---|---|---|
| 3,402,055 | 9/1968 | Harris et al. | 106/50 |
| 3,441,381 | 4/1969 | Keith et al. | 422/176 |
| 3,795,524 | 3/1974 | Sowman | 501/95 |
| 3,876,384 | 4/1975 | Santiago et al. | 23/288 |
| 3,885,977 | 5/1975 | Lachman et al. | 501/128 |
| 3,996,145 | 12/1976 | Hepburn | 252/62 |
| 4,070,519 | 1/1978 | Lefkowitz et al. | 428/235 |
| 4,113,535 | 9/1978 | Lefkowitz et al. | 156/148 |
| 4,181,504 | 1/1980 | Lefkowitz et al. | 210/504 |
| 4,269,807 | 5/1981 | Bailey et al. | 422/179 |
| 4,279,864 | 7/1981 | Nara et al. | 422/179 |
| 4,381,590 | 5/1983 | Nonnenmann et al. | 29/157 |
| 4,514,880 | 5/1985 | Vaughn | 19/0.35 |
| 4,640,810 | 2/1987 | Laursen et al. | 264/518 |
| 4,681,801 | 7/1987 | Eian et al. | 428/283 |
| 4,693,338 | 9/1987 | Clerc | 181/231 |
| 4,752,515 | 6/1988 | Hosoi et al. | 428/114 |
| 4,755,423 | 7/1988 | Greiser et al. | 428/284 |
| 4,847,140 | 7/1989 | Jaskowski | 428/220 |
| 4,861,653 | 8/1989 | Parrish | 428/288 |
| 4,929,429 | 5/1990 | Merry | 422/179 |
| 4,931,239 | 6/1990 | Hosoi et al. | 264/63 |
| 4,963,327 | 10/1990 | Russell | 422/122 |
| 4,999,168 | 3/1991 | Ten Eyck | 422/179 |
| 5,028,397 | 7/1991 | Merry | 422/179 |
| 5,104,713 | 4/1992 | Hosoi et al. | 428/114 |
| 5,132,169 | 7/1992 | Olry et al. | 428/300 |
| 5,190,657 | 3/1993 | Heagle et al. | 210/505 |

FOREIGN PATENT DOCUMENTS

| 3514150C1 | 4/1986 | Fed. Rep. of Germany | B01D 53/36 |
|---|---|---|---|
| 1452982 | 10/1976 | United Kingdom | F01N 3/15 |

OTHER PUBLICATIONS

S-2 Glass ™ Fiber brochure entitled "Enhanced properties for demanding applications," Owens-Corning Fiberglas Corporation, Pub. No. 15-PL-16154, Mar., 1990.

S-2 Glass ™ Fibers brochure entitled "Fiber Usage in Ford Catalytic Coverters," Owens-Corning Fiberglas Corporation, Pub. No. 15-ASP-12172-B, Oct. 1988.

*Primary Examiner*—Robert J. Warden
*Assistant Examiner*—Hien Tran
*Attorney, Agent, or Firm*—Gary L. Griswold; Walter N. Kirn; Gregory D. Allen

[57] ABSTRACT

The present invention relates to a catalytic converter including a nonwoven mat comprising shot-free, high strength, magnesium aluminosilicate glass fiber.

13 Claims, 1 Drawing Sheet

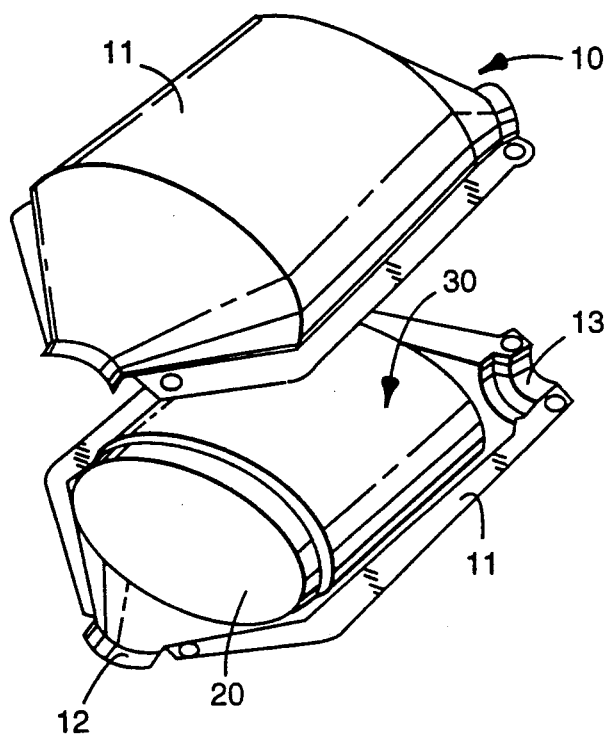

CATALYTIC CONVERTER MOUNTING MAT

FIELD OF THE INVENTION

The present invention relates to a catalytic converter including a nonwoven mounting mat comprising shot-free magnesium aluminosilicate glass fibers.

DESCRIPTION OF THE RELATED ART

Catalytic converter mounting mats comprised of ceramic fibers are known in the art. Catalytic converters with ceramic monoliths typically have a gap between the monolith and a metal casing. The gap size changes during heating due to thermal expansion differences between the monolith material and the casing material. For example, if the monolith is ceramic, the gap typically increases upon heating. Mounting materials require resiliency to provide support for the monoliths as the converter is cycled between high and low temperatures (e.g., temperature ranges encountered in the operation of an automobile engine (typically ambient to about 870° C.). Such mats must be able to withstand temperature cycling and respond to changes in the gap between the monolithic converter body and the metal casing. Therefore, the mats must be able to compress and spring back through the temperature cycle.

Typically, it is difficult to obtain a handleable, non-friable mat with suitable for use as a catalytic converter mat. Solutions to this problem include stitchbonding the fibers together, or using scrim to hold a mat of fibers in place.

Alternatively catalytic converter mounting mats include those employing loose fibers or "bagged" fibers. For example, fibers are placed in plastic bags and mounted around a catalytic converter to provide necessary cushioning. The plastic burns out during use, leaving loose fibers around the monolith. Problem associated with this method include cost and processing difficulties.

SUMMARY OF THE INVENTION

The present invention provides a catalytic converter comprising a metallic casing, a unitary, solid catalytic element disposed within the casing, and a nonwoven mat positioned between the catalytic element and the metallic casing, the nonwoven mat comprising shot-free, high strength magnesium aluminosilicate glass fibers, the glass fibers having a diameter greater than 5 micrometers, a length greater than about 0.5 cm, and comprising in the range from about 4 to about 20 percent by weight magnesium oxide, about 12.6 to about 32 percent by weight aluminum oxide, and about 79.9 to about 55 percent by weight silicon oxide, based on the total weight of the glass fibers, wherein the weight percent of magnesium oxide, aluminum oxide, and silicon oxide is calculated on a theoretical oxide basis as $MgO$, $Al_2O_3$, and $SiO_2$, respectively. Preferably, the nonwoven mat is essentially free of ceramic fiber having a diameter less than 3 micrometers, more preferably, less than 5 micrometers. In another aspect, the nonwoven mat is preferably shot-free.

The nonwoven mat typically comprises at least 60 percent by weight of the shot-free, high strength, magnesium aluminosilicate glass fibers, preferably, at least 90 percent by weight, based on the total weight of the mat.

Preferably, the nonwoven mat according to the present invention is stitchbonded or needle-punched.

The nonwoven mat can further comprise a high strength fiber selected from the group consisting of carbon fibers, silicon carbide fibers, silicon nitride fibers, ceramic oxide fibers other than magnesium aluminosilicate glass fibers, metal fibers (e.g., stainless steel fibers, copper fibers, and brass fibers), and mixtures thereof.

In this application:

"high strength fiber" as used herein refers to a fiber having an average tensile strength of greater than about 700 MPa (100,000 psi);

"tensile strength" of a fiber is the load under which the fiber breaks divided by the cross-sectional area of the fiber;

"shot-free" as used herein means free of particulate ceramic (i.e., crystalline ceramic, glass, or glass-ceramic) from the fiber manufacture process;

"individualized" as used herein refers to fibers that have been separated from multifilament yarn or to a group of fibers (e.g., a tow) that have been separated to provide individual fibers;

"fugitive fibers" refer to fibers that decompose and volatilize when heated (e.g., organic fibers), or that can be dissolved away (e.g., water soluble fibers);

"binder" as used herein refers to a high temperature (i.e., above about 400° C., preferably above about 500° C.) bonding agent such as colloidal silicon, low melting (i.e., up to 1150° C., preferably, about 400° to about 800° C.) glass, and glass fluxing agents (e.g., potasia, soda, and boria); and "resilient" refers to the capability of a mat to recover its size and shape after deformation caused by compressive stress.

A conventional nonwoven mat of glass fibers typically shrinks when heated to the temperatures encountered in the operation of an automobile engine. Thus, although such nonwoven mats have adequate cold holding performance (i.e., can hold a catalytic converter in a metal casing at room temperature), they do not retain the necessary holding capabilities when heated to the actual use temperatures. Surprisingly, a nonwoven mat according to the present invention comprising magnesium aluminosilicate fibers described herein has both good cold holding and high temperature (i.e., up to about 870° C.) holding characteristics.

A needle-punched mat is preferred over a stitch-bonded mat. A catalytic converter holding mat usually needs to have a weight per unit area value of about 2000 $g/m^2$ or more. Due to processing equipment limitations, the weight per unit area value of a stitch bonded nonwoven mat is typically not greater than about 1500 $g/m^2$. When stitch bonded nonwoven mats are used to hold a catalytic converter two or more mats are glued together to provide the proper thickness or weight per unit area value. The needle-punched, nonwoven mat according to the present invention, however, can have a weight per unit area value greater than about 2000 $g/m^2$. Thus, the use of a needle-punched mat provides a more convenient solution, which is cheaper (e.g., lower processing costs) and reduces the amount of organic material which is released into the atmosphere when the organic material is burned away.

BRIEF DESCRIPTION OF THE DRAWING

The drawing is a perspective view of a catalytic converter of the present invention shown in disassembled relation.

DETAILED DESCRIPTION OF THE PREFERRED EMBODIMENTS

Referring to FIG. 1 catalytic converter 10 comprises metallic casing 11 with generally frustoconical inlet and outlet ends 12 and 13, respectively. Disposed within casing 11 is a monolithic catalytic element 20 formed of a honeycombed monolithic body having a plurality of gas flow channels (not shown) therethrough. Surrounding catalytic element 20 is mounting mat 30 comprising the shot-free, high-strength, magnesium aluminosilicate glass fibers which serves to tightly but resiliently support catalytic element 20 within the casing 11. Mounting mat 30 holds catalytic element 20 in place in the casing and seals the gap between the catalytic element 20 and casing 11 to thus prevent or minimize exhaust gases from by-passing catalytic element 20.

The metallic casing can be made from materials known in the art for such use including stainless steel.

Suitable catalytic converter elements are known in the art and include those made of metal and ceramic. A useful catalytic converter element is disclosed, for example, in U.S. Pat. No. Re 27,747 (Johnson), the disclosure of which is incorporated herein by reference for its teaching of catalytic converter elements. Further, ceramic catalytic converter elements are commercially available from Corning Inc. of Corning, N.Y. For example, a honeycomb ceramic catalyst support is marketed under the trade designation "CELCOR" by Corning Inc. and "HONEYCERAM" by NGK Insulated Ltd. Metal catalytic converter elements are commercially available from Behr GmbH and Co. of Germany. For additional details regarding catalytic monoliths see, for example, "Systems Approach to Packaging Design for Automotive Catalytic Converters," Stroom et al., Paper No. 900500, SAE Technical Paper Series; "Thin Wall Ceramics as Monolithic Catalyst Supports," Howitt, Paper No. 800082, SAE Technical Paper Series; and "Flow Effects in Monolithic Honeycomb Automotive Catalytic Converters," Howitt et al., Paper No. 740244, SAE Technical Paper Series, the disclosures of which are incorporated herein by reference for their teaching of catalytic converters.

The catalyst used in such catalytic converter elements are typically metals (e.g., ruthenium, osmium, rhodium, iridium, nickel, palladium, and platinum) and metal oxides (e.g., vanadium pentoxide and titanium dioxide). For further details regarding catalytic coatings see, for example, U.S. Pat. No. 3,441,381 (Keith et al.), the disclosure of which is incorporated herein by reference for its teaching of catalytic coatings.

The shot-free, high strength magnesium aluminosilicate glass fibers preferably have a diameter in the range from greater than 5 to about 20 micrometers. Fibers having a diameter greater than about 20 are useful but tend to be difficult to form into a nonwoven mat using the processes disclosed herein.

The shot-free magnesium aluminoborosilicate glass fibers typically have an average tensile strength in the range from about 2800 MPa (400,000 psi) to about 4200 MPa (600,000 psi). Although not wanting to be bound by theory, it is believed that the higher tensile strengths, allow for the formation of chopped and separated fibers without simultaneously pulverizing the fibers into powder.

High strength fibers are typically available in continuous tows (also referred to as rovings) or yarns.

Although the continuous fibers used to prepare the nonwoven mat can be sized or unsized (i.e., essentially free of size), the fibers are preferably sized. Typically, continuous fibers are treated with organic sizing during their manufacture to provide lubricity and to protect the fiber strands during handling. It is believed that the sizing tends to reduce the breakage of fibers, hold individual fibers together in a tow, and reduce the amount of dust produced during the needle punching or other handling steps involved in making the nonwoven mat.

Conventional sizing materials include dextrinized starch gum, gelatin, polyvinyl alcohol, hydrogenated vegetable oils, and non-ionic detergents.

Suitable shot-free, high strength, magnesium aluminosilicate glass fibers are known in the art and include those commercially available, for example, under the trade designation "S2-GLASS" from the Owens-Corning Fiberglas Corp. of Granville, Ohio.

The nonwoven mat can further comprise high strength (i.e., an average tensile strength greater than 700 MPa (100,000 psi), preferably greater than about 1200 MPa (200,000 psi), more preferably, greater than about 1800 MPa (300,000 psi), and, most preferably, greater than about 2100 MPa (350,000 psi) fiber (preferably, sized) selected from the group of fibers consisting of ceramic oxide fibers other than magnesium aluminosilicate glass fibers (e.g., aluminosilicate fibers (including aluminoborosilicate fibers) and quartz fibers (including crystalline quartz fibers)), alumina fibers, carbon fibers, silicon carbide fibers, silicon nitride fibers, and metal fibers. Sized aluminoborosilicate fibers are commercially available, for example, under the trade designations "NEXTEL 312," "NEXTEL 440," and "NEXTEL 480" from the 3M Company. Further, suitable aluminoborosilicate fibers can be made as disclosed, for example, in U.S. Pat. No. 3,795,524 (Sowman), the disclosure of which is incorporated herein by reference.

Sized aluminosilicate fibers are commercially available, for example, under the trade designation "NEXTEL 550" from the 3M Company. Further, suitable aluminosilicate fibers can be made as disclosed, for example, in U.S. Pat. No. 4,047,965 (Karst et al.), the disclosure of which is incorporated herein by reference.

Sized quartz fibers are commercially available, for example, under the trade designations "ASTROQUARTZ" from J. P. Stevens, Inc., of Slater, N.C.

Silicon carbide fibers are commercially available, for example, under the trade designations "NICALON" from Nippon Carbon of Tokyo, Japan; "NICALON" from Dow Corning of Midland, Mich.; and "TYRANNO" from Textron Specialty Materials of Lowell, Mass.

Silicon nitride fibers are available, for example, from Toren Energy International Corp. of New York, N.Y.

Carbon (e.g., graphite) fibers are commercially available, for example, under the trade designation "IM7" from Hercules Advanced Material & Systems of Magna, Utah.

Stainless steel fibers are commercially available, for example, under the trade designation "BEKINOX" from Bekaert of Zweregan, Belgium.

The nonwoven mat can further comprise fugitive material (e.g., heat fugitive materials such as thermoplastic, nylon, and rayon fibers, powders, films, and webs, and water soluble materials such as polyvinyl alcohol). Preferably, the nonwoven mat comprises less than 15 percent by weight (preferably, less than 10 percent by weight) fugitive material, based on the total weight of the nonwoven mat. Thermoplastic fibers, for example, are known in the art and are commercially available, for example, from Hoechst-Celanese of Summit, N.J. Thermoplastic fibers can be useful, for example, to bond, when sufficiently heated, to ceramic fibers to aid in holding the mat together and to increase the mat handleability. Further, heat fugitive fibers can be burned out of the mat to provide a desired structure or porosity.

To provide individualized (i.e., separate each fiber from each other) fibers, a tow or yarn of fibers can be chopped, for example, using a glass roving cutter (commercially available, for example, under the trade designation "MODEL 90 GLASS ROVING CUTTER" from Finn & Fram, Inc., of Pacoma, Calif.), to the desired length (typically in the range from about 0.5 to about 15 cm).

In a preferred method for making the nonwoven mat, the cut or chopped fibers can be separated by passing them through a conventional hammer mill, preferably a blow discharge hammer mill (e.g., commercially available under the trade designation "BLOWER DISCHARGE MODEL 20 HAMMER MILL" from C.S. Bell Co. of Tiffin, Ohio). Although less efficient, the fibers can be individualized using a conventional blower such as that commercially available under the trade designation "DAYTON RADIAL BLOWER," Model 3C 539, 31.1 cm (12.25 inches), 3 horsepower from W. W. Grainger of Chicago, Ill. Typically, the chopped fibers are passed through the hammer mill at least twice. If a blower is used alone, the fibers are typically passed through it at least twice. Preferably, at least 50 percent by weight of the fibers are individualized before they are formed into a nonwoven mat.

Although cut or chopped fibers greater than about 15 cm are also useful in preparing the nonwoven mat, they tend to be more difficult to process. Separation of the fibers tends to increase the loftiness (i.e., decrease the bulk density), of the fibers making up the nonwoven mat thereby lowering the density of the resulting mat.

To facilitate processing and separation of the chopped or cut fibers with minimal breakage an antistatic lubricant (e.g., such as that commercially available under the trade designation "NEUTROSTAT" from Simco Co. Inc., of Hatfield, N.J.) can be sprayed into the hammer mill while the fibers are being separated.

In a preferred method for making the nonwoven mat, chopped, individualized fibers (preferably, about 2.5 to about 5 cm in length) are fed into a conventional web-forming machine (commercially available, for example, under the trade designation "RANDO WEBBER" from Rando Machine Corp. of Macedon, N.Y.; or "DAN WEB" from ScanWeb Co. of Denmark), wherein the fibers are drawn onto a wire screen or mesh belt (e.g., a metal or nylon belt). If a "DAN WEB"-type web-forming machine is used, the fibers are preferably individualized using a hammer mill and then a blower. Fibers having a length greater than about 2.5 cm tend to become entangled during the web formation process. To facilitate ease of handling of the mat, the mat can be formed on or placed on a scrim. Depending upon the length of the fibers, the resulting mat typically has sufficient handleability to be transferred to a needle punch machine without the need for a support (e.g., a scrim).

The nonwoven mat can also be made using conventional wet-forming or textile carding. For wet forming processes, the fiber length is preferably about 0.5 to about 6 cm. For textile processes, the fiber length is preferably about 5 to about 10 cm.

A needle-punched nonwoven mat refers to a mat wherein there is physical entanglement of fibers provided by multiple full or partial (preferably, full) penetration of the mat, for example, by barb needles. The nonwoven mat can be needle punched using a conventional needle punching apparatus (e.g., a needle puncher commercially available under the trade designation "DILO" from Dilo of Germany, with barbed needles (commercially available, for example, from Foster Needle Company, Inc., of Manitowoc, Wis.)) to provide a needle-punched, nonwoven mat. Needle punching, which provides entanglement of the fibers, typically involves compressing the mat and then punching and drawing barbed needles through the mat. The optimum number of needle punches per area of mat will vary depending on the particular application. Typically, the nonwoven mat is needle punched to provide about 5 to about 60 needle punches/cm$^2$. Preferably, the mat is needle punched to provide about 10 to about 20 needle punches/cm$^2$.

Preferably, the needle-punched, nonwoven mat has a weight per unit area value in the range from about 1000 to about 3000 g/m$^2$, and in another aspect a thickness in the range from about 0.5 to about 3 centimeters.

The nonwoven mat can be stitchbonded using conventional techniques (see e.g., U.S. Pat. No. 4,181,514 (Lefkowitz et al.), the disclosure of which is incorporated herein by reference for its teaching of stitchbonding nonwoven mats). Typically, the mat is stitchbonded with organic thread. A thin layer of an organic or inorganic sheet material can be placed on either or both sides of the mat during stitchbonding to prevent or minimize the threads from cutting through the mat. Where it is desired that the stitching thread not decompose in use, an inorganic thread, such as ceramic or metal (e.g., stainless steel) can be used. The spacing of the stitches is usually from 3 to 30 mm so that the fibers are uniformly compressed throughout the entire area of the mat.

Objects and advantages of this invention are further illustrated by the following examples, but the particular materials and amounts thereof recited in these examples, as well as other conditions and details, should not be construed to unduly limit this invention.

EXAMPLE 1

Example 1 was prepared by chopping tows of 9 micrometer diameter shot-free, high strength, magnesium aluminosilicate glass fibers (commercially available under the trade designation "S2-GLASS" from Owens-Corning Fiberglas Corp.) into 2.5 cm (1 inch) lengths using a conventional glass roving cutter (commercially available under the trade designation "MODEL 90 GLASS ROVING CUTTER" from Finn & Fram, Inc.). The lengths were passed twice through a conventional hammer mill (commercially available under the trade designation "BLOWER DISCHARGE MODEL 20 HAMMER MILL" from C.S. Bell Co.). The screen located in the hammer mill chamber was removed. The hammer mill speed was about 1850 rpm. The fiber lengths were then fed into a conventional web-forming machine (commercially available under the trade designation "RANDO WEBBER" from Rando Machine Corp. of Macedon, N.Y.), wherein the fibers were blown onto a porous metal (wire screen) condenser. The thickness of the mat was about 0.33 cm (⅛ inch).

The mat was then needle punched using a conventional needle punching apparatus (commercially available under the trade designation "DILO" from Dilo of Germany), with type #15×18×36×3.5 RB barbed needles (commercially available from Foster Needle Company, Inc., of Manitowoc, Wis.) to provide about 15 punches/cm². The barbed needles were punched through the full thickness of the mat. The thickness of the needle-punched, nonwoven mat was about 0.16 cm (1/16 inch).

EXAMPLE 2

Example 2 was prepared by chopping tows of 9 micrometer diameter shot-free, high strength, magnesium aluminosilicate glass fibers ("S2-GLASS") into 0.65 cm (¼ inch) lengths using a conventional glass roving cutter ("MODEL 90 GLASS ROVING CUTTER"). The sizing was removed from the fibers by heating them for about 30 minutes at about 700° C.

A high shear, large capacity blender was charged with about 2110 liters (500 gallons) of water and about 5.4 kilograms (12 lbs.) of the desized, chopped fibers. The fibers were mixed in the high shear blender for about 30 minutes to individualize the fibers.

Next, about 862 grams (1.9 lbs.) of a 32% sodium aluminate ($Na_2Al_2O_3$) aqueous solution (commercially available under the trade designation "NALCO 2372" from Nalco Chemical Co. of Naperville, Ill.) was added to and stirred with the fibers and water in the high shear blender. This mixture was then pumped into a tank and diluted with water to 5908 liters (1400 gallons).

About 4.5 kilograms (10 lbs.) of a 46% acrylic latex aqueous solution (commercially available under the trade designation "ROHMPLEX HA8" from Rohm and Haas of Philadelphia, Pa.) was then added to and stirred with the diluted mixture.

About 6.8 kilograms (15 lbs.) of a 47–49% aluminum sulfate ($Al_2(SO_4)_3 \cdot 0.14\ H_2O$) was then added to and stirred with the diluted mixture.

The mixture was cast into mats using a conventional Fourdinier paper making machine employing a steam, drum drier. To minimize foaming during casting into mats, about 25 ml of a defoaming agent (a petroleum derivative; commercially available under the trade designation "FOAMASTER" from Henkel of Ambler, Pa.) was added to and stirred into the mixture just before casting. The cast, nonwoven mat had a weight per unit area value of about 200–300 g/m², and a thickness of about 0.33 cm (⅛ inch).

EXAMPLE 3

Example 3 was prepared as described in Example 2 except the initial charge of the high shear blender was about 2110 liters (500 gallons) of water, about 2.7 kilograms (6 lbs.) of the chopped glass fibers, and about 570 grams (1.25 lbs.) of 1.25 cm long, 3 denier thermoplastic fibers (type HC106; bicomponent polyester/polyethylene fibers from Hoechst-Celanese Corp. of Summit, N.J.).

The cast, nonwoven mat was about 0.33 cm (⅛ inch) thick, and had a weight per unit area value of about 200–300 g/m². The mat was die cut into 2.5 cm diameter circles for resiliency testing.

The resiliency of each nonwoven mat was measured using a compression tester (commercially available under the trade designation "INSTRON TESTER," Model #1130, from Instron Corp. of Canton, Mass.) modified to have two vertically aligned, stainless steel anvils with 2.5 cm diameter faces. To allow for simulation of elevated temperatures, each anvil contained a cartridge heater. Further, the distance between the anvil faces was adjustable. The resiliency of the mats were tested by placing each test sample between the two opposite faces of the anvils and then closing the gap between the anvils faces as specified in Table 1, below. The pressure exerted on the mat by the anvils was then recorded. While reducing the gap width between the anvils as specified in Table 1 (below) the top anvil was heated from room temperature (i.e., about 25° C.) to the temperature specified in Table 1, below, and the bottom anvil from room temperature to the temperature specified in Table 1 (below). The pressure exerted on the mat by the anvils was then recorded. Finally, the heaters were turned off and the anvils (and mat) permitted to cool to room temperature, while the gap between the anvils was adjusted back as specified in Table 1, below. The mount density was determined based on the gap width and the original thickness and density of the mat. The test results are given in Table 1, below.

TABLE 1

| Example | Anvil temperature, top/bottom, °C. | Mount density, g/cm³ | Gap, mm | KPa |
|---|---|---|---|---|
| 1A | 25/25 | 0.32 | 3.89 | 245 |
|  | 600/345 |  | 3.68 | 296 |
|  | 25/25 |  | 3.89 | 63 |
| 1B | 25/25 | 0.47 | 3.02 | 683 |
|  | 700/220 |  | 2.82 | 447 |
|  | 25/25 |  | 3.02 | 66 |
| 1C | 25/25 | 0.27 | 4.01 | 45 |
|  | 600/345 |  | 3.81 | 8 |
|  | 25/25 |  | 4.01 | 4 |
| 2 | 25/25 | 0.35 | 4.17 | 188 |
|  | 600/345 |  | 3.96 | 74 |
|  | 25/25 |  | 4.17 | 36 |
| 3 | 25/25 | 0.35 | 4.17 | 596 |
|  | 600/345 |  | 3.96 | 296 |
|  | 25/25 |  | 4.17 | 129 |

Typically, the higher the pressure recorded for this test, the better the expected holding characteristic of the mat for use as a catalytic converter mounting mat. The mount of density of Example 1C would tend to be lower than would be used to mount a catalytic converter. Typically, the mount density is at least 0.3 g/cm³, preferably, about 0.35 g/cm³ or more.

COMPARATIVE EXAMPLE I

Comparative Example I was a nonwoven mat comprising melt spun leached fiberglass (fibers having a tensile strength of 210–420 MPa; fiber diameter of about 10 micrometers; commercially available under the trade designation "REFRASIL" from Carborundum Co. of Niagara Falls, N.Y.).

A hot shake test was used to further evaluate the suitability of the nonwoven mats as a catalytic converter mounting mat. The hot shake test involved passing exhaust gas through a catalytic converter element mounted with each nonwoven mat in a metal casing while simultaneously subjecting the catalytic converter assembly to mechanical vibration sufficient to provide an acceleration of up to 40 g's at a frequency of 100 Hz. The vibration was supplied by a conventional vibrator (commercially available from Unholtz-Dickie Corp. of Wallingford, Conn.). The heat source was a natural gas burner capable of supplying gas inlet temperature to the converter of about 800°–900° C. The exhaust gas temperature was cycled to test the mat's ability to maintain its resiliency and corresponding holding force while the space it occupies changes dimension. Each cycle included 10 minutes at the high temperature and 10 minutes with the gas shut off. Vibration was maintained throughout the thermal cycling. The duration of the test was 20 cycles. A 12.7 cm diameter ceramic honeycomb monolith (commercially available under the trade designation "CELCOR" from Corning Inc. of Corning, N.Y.) was used for testing Example 1. Corrugated metal monoliths having a diameter of 12.7 cm were used to test the Examples 2 and 3 and Comparative Example I. The results are provided in Table 2, below.

TABLE 2

| Example | Mat weight, g | Gap, mm | Density, g/cm³ | Gas Inlet Temp., °C. | Pass/Fail* |
|---|---|---|---|---|---|
| 1 | 99.4 | 4.4 | 0.36 | 900 | passed |
| 2 | 47.4 | 4.3 | 0.38 | 800 | passed |
| 3 | 54 | 4.2 | 0.43 | 800 | passed |
| Comp. I | 52.1 | 4.3 | 0.41 | 800 | failed** |

*"passed" means no movement of the monolith; "failed " means movement of the monolith.
**failed on the first cycle.

The results of Example 1, 2, and 3 are surprising because the upper use temperature of the "S2 GLASS" fibers according to Owens-Corning Fiberglas Corp. trade literature is about 760° C.

Various modifications and alterations of this invention will become apparent to those skilled in the art without departing from the scope and spirit of this invention, and it should be understood that this invention is not to be unduly limited to the illustrative embodiments set forth herein.

We claim:

1. A catalytic converter comprising a metallic casing, a unitary, solid catalytic element disposed within said casing, and a nonwoven mat positioned between said catalytic element and said metallic casing, said nonwoven mat comprising at least 60 percent by weight shot-free, high strength magnesium aluminosilicate glass fibers, based on the total weight of said mat, said glass fibers having a diameter greater than 5 micrometers, a length greater than about 0.5 cm, and comprising in the range from about 4 to about 20 percent by weight magnesium oxide, about 12.6 to about 32 percent by weight aluminum oxide, and about 79.9 to about 55 percent by weight silicon oxide, based on the total weight of said glass fibers, wherein said weight percent of magnesium oxide, aluminum oxide, and silicon oxide is calculated on a theoretical oxide basis as MgO, $Al_2O_3$, and $SiO_2$, respectively.

2. The catalytic converter according to claim 1 wherein said nonwoven mat has a mount density of at least 0.3 g/cm³.

3. The catalytic converter according to claim 2 wherein said nonwoven mat is needle-punched.

4. The catalytic converter according to claim 2 wherein said nonwoven mat is stitchbonded.

5. The catalytic converter according to claim 2, wherein said shot-free, high strength magnesium aluminosilicate glass fibers are sized.

6. The catalytic converter according to claim 2, wherein said shot-free, high strength magnesium aluminosilicate glass fibers are essentially free of size.

7. The catalytic converter according to claim 2, wherein said nonwoven mat is essentially free of shot.

8. The catalytic converter according to claim 2, wherein said nonwoven mat is essentially free of ceramic fiber having a diameter less than 5 micrometers.

9. The catalytic converter according to claim 2, wherein said nonwoven mat is essentially free of ceramic fiber having a diameter less than 3 micrometers.

10. The catalytic converter according to claim 2, said nonwoven mat comprising a plurality of layers of said shot-free ceramic oxide fibers.

11. The catalytic converter according to claim 2, wherein said nonwoven mat further comprises high strength fibers selected from the group consisting of aluminosilicate fiber other than magnesium aluminosilicate glass fibers, silicon carbide fibers, silicon nitride fibers, carbon fibers, stainless steel fibers, and mixtures thereof.

12. The catalytic converter according to claim 2, wherein said nonwoven mat further comprises high strength aluminoborosilicate fibers.

13. The catalytic converter according to claim 2, wherein said nonwoven mat comprises at least 90 percent by weight of said shot-free, high strength magnesium aluminosilicate glass fibers, based on the total weight of said mat, and has a mount density of at least 0.3 g/cm³.

* * * * *